US006954559B2

(12) United States Patent
Arahira

(10) Patent No.: US 6,954,559 B2
(45) Date of Patent: Oct. 11, 2005

(54) RE-GENERATOR OF OPTICAL CLOCK SIGNAL

(75) Inventor: Shin Arahira, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 10/859,596

(22) Filed: Jun. 3, 2004

(65) Prior Publication Data

US 2005/0013524 A1 Jan. 20, 2005

(30) Foreign Application Priority Data

Jun. 4, 2003 (JP) ...................................... 2003-159136

(51) Int. Cl.$^7$ ................................................ G02B 6/00
(52) U.S. Cl. ...................... 385/11; 372/18; 398/152; 398/153; 398/154; 398/155
(58) Field of Search ............. 385/11, 24; 398/152–155; 372/18

(56) References Cited

U.S. PATENT DOCUMENTS 4,910,738 A * 3/1990 Fujita et al. .................. 372/18
5,353,146 A * 10/1994 Webb ......................... 398/175

FOREIGN PATENT DOCUMENTS

JP          2002-258338     *  9/2002

OTHER PUBLICATIONS

Ono et al, "Optical clock extraction from 10–GBit/s data pulses by using monolithic mode–locked laser diodes". OFC'95 Technical Digest, ThL4 pp 288–289.*

Jinno et al, "Ultrafast, Low Paper, and Highly Stable All–Optical Switching in an All Polarization Maintaing Fiber Sanac Interferometer" IEEE Photonics Technology Letters, vol. 2, No. 5, May 1990 pp 349–351.*

T. Ono, T Shimizu, Y. Yano, and H. Yokoyama, "Optical clock extraction from 10–Gbit/s data pulses by using monolithic mode–locked laser diodes", OFC'95 Technical Digest, ThL4 P288–289.

M. Jinno and T. Matsumoto, "All–Optical Timing Extraction Using A 1.5um Self Pulsating Multielectrode DFB LD", Electronics Letters 10$^{th}$ Nov. 1988 vol. 24, P1426–1427.

Young–Kai Chen and Ming C. Wu, "Monolithic Colliding–Pulse Mode–Locked Quantum–Well Lasers". 1992 IEEE, P2176–2185.

* cited by examiner

*Primary Examiner*—Frank G. Font
*Assistant Examiner*—Derek L. Dupuis
(74) *Attorney, Agent, or Firm*—Rabin & Berdo, P.C.

(57) ABSTRACT

A re-generator of an optical clock signal has at least a mode-locked semiconductor laser outputting a re-generated optical clock signal from at least one end face of the mode-locked semiconductor laser, with inputted light signals having different polarized wave states respectively at both end faces of the mode-locked semiconductor laser; wherein the re-generator has a light splitter to split the light signal into two kinds of elements with respective polarized waves different by a right angle, and to emit one of the elements split from the light signal, to one of both end faces of the mode-locked semiconductor laser; and a rotator to input the other elements split from the light signal, to rotate the other elements by a right angle, and to lead the rotated element to the other end face of the mode-locked semiconductor laser.

10 Claims, 5 Drawing Sheets

RE-GENERATOR OF OPTICAL CLOCK SIGNAL

BACKGROUND OF THE INVENTION

1. Field of the Invention

The present invention relates to a re-generator of an optical clock signal used for an optical repeater in a large optical fiber network.

2. Description of Related Art

Recently, the optical communication network has become larger, using high capacity optical fibers of long lengths. In this kind of optical fiber network, optical repeaters are placed in prescribed positions with a prescribed interval, so as to re-generate light signal. The reason why light signal is re-generated, is to reinforce the light signal as it is weakened by transmission over a long distance. Therefore, it is necessary for the optical re-generator to re-generate optical clock signal accurately.

The conventional optical repeater temporarily transforms a light signal into an electric signal. Then, this repeater re-generates an accurate electric clock signal from this electric signal, and it transforms this re-generated electric clock signal into an optical clock signal once again. In this way, optical clock signal was accurately re-generated.

However, recently, as the high bit rate of a light signal increases, an electric device is not able to catch up with these increases in the high bit rate.

Therefore, it is necessary that a technique to re-generate a light signal directly, rather than transforming the light signal into an electric signal temporarily, be introduced. As an example of this technique, a method of using a mode-locked semiconductor laser has been disclosed (c.f. T. Ono, T. Shimizu, Y. Yano, and H. Yokoyama, OFC'95 Technical Digest, ThL4 P288–289 "Optical clock extraction from 10-Gbit/s data pulses by using monolithic mode-locked laser diodes").

Operation of a clock re-generator using the mode-locked semiconductor laser disclosed by this document, depends on the angular position of the surface of a polarized wave of the inputted light signal. That is, this kind of semiconductor laser operates very well when the inputted light signal is in horizontal polarized wave state. However, it does not operate well when the inputted light signal is in a vertical polarized wave state.

On the other hand, optical glass fiber (usually, single mode optical fiber), which is used as the medium for distant transmission of a light signal, does not depend on the state of the polarized wave at all. That is, the light signal in an optical fiber travels very well regardless of the state of the light signal, be it a horizontal polarized wave or a vertical polarized wave. However, the state of the polarized wave can be rotated by the optical fiber if laid in a certain place or by the circumstances over the route of the optical fiber.

Therefore, even when a light signal accurately controlled in a horizontal polarized wave state is inputted to an input terminal of an optical fiber, elements of the inputted light signal can be rotated unintentionally. And, at the end of the optical fiber, elements of the horizontal polarized wave and the vertical polarized wave coexist.

As a result, the operation of the re-generator using a mode-locked semiconductor laser, becomes unstable, when the light signal is inputted over a certain length of optical fiber. And, this problem remained unsolved.

SUMMARY OF THE INVENTION

The present invention adopts the following configuration, so as to solve the problem mentioned above.

Configuration 1

According to one aspect of the present invention, the configuration of the present invention is a re-generator of the optical clock signal comprising at least a mode-locked semiconductor laser outputting a re-generated optical clock signal from at least one end face of the mode-locked semiconductor laser, with inputted light signals having different polarized wave state respectively at both end faces of the mode-locked semiconductor laser; wherein the re-generator is characterized by comprising; a light splitter to split the light signal into two kinds of elements with respective polarized waves different by a right angle, and to emit one of the elements split from the light signal, to one of both end faces of the mode-locked semiconductor laser; and a rotator to input the other elements split from the light signal, to rotate the other elements by a right angle, and to lead rotated element to the other end face of the mode-locked semiconductor laser.

Configuration 2

According to another aspect of the present invention, the configuration of the present invention is a re-generator of optical clock signal characterized by comprising; a direction limiter of light transmission, to emit a light signal inputted from a first terminal to a second terminal, and to emit a light signal inputted from the second terminal to a third terminal; a light splitter to split the light signal inputted through a first port from the second terminal, into two kinds of elements with respective polarized waves different by a right angle, and to emit one of the elements split from the light signal, to a second port, and to emit the other elements split from the light signal, to a third port, and to emit the light signal inputted from the second port and other light signal inputted from the third port, to the first port; a rotator to input the other light signal elements from the third port and to rotate the other light signal elements by a right angle, so as to emit a light signal element which polarized wave is same as the one of the light signal elements; and a mode-locked semiconductor laser to be inputted at one end face with the light signal element outputted from the rotator, to be inputted at the other end face with the one of the light signal elements split by the light splitter, and to emit a re-generated optical clock signal from at least one of both end face of the mode-locked semiconductor laser.

Configuration 3

According to the other aspect of the present invention, the configuration of the present invention is a re-generator of optical clock signal comprising; a light splitter to split the light signal inputted through a first port, into two kinds of elements with respective polarized waves different by a right angle, and to emit one of the elements split from the light signal, to a second port, and to emit the other elements split from the light signal, to a third port, and to emit the light signal inputted from the second port to a fourth port, and other light signal inputted from the third port, to the first port; a first rotator to input the other light signal elements from the third port and to rotate the other light signal elements by half a right angle, so as to emit a light signal element which polarized wave is rotated by half a right angle; a second rotator to input one of the light signal elements from the second port and to rotate one of the light signal elements by half a right angle without depending on transmitting direction of light signal, so as to emit a light signal element which polarized wave is rotated by a half right angle to a rotary direction opposite to said first rotator when light signal goes and same as said first rotator when light signal comes back; and a mode-locked semiconductor laser declined by a half right angle to a rotary direction opposite to said first rotator, that is, same as said second rotator, to be inputted at one end face with the light signal element which polarized wave is rotated by a half right angle outputted from the first rotator, to be inputted at the other end face with the light signal element which polarized wave is rotated by a half right angle to a rotary direction opposite to said first rotator outputted from the second rotator, and to emit a re-generated optical clock signal from at least one of both end faces of the mode-locked semiconductor laser.

DESCRIPTION OF THE PREFERRED EMBODIMENTS

Figure 1:
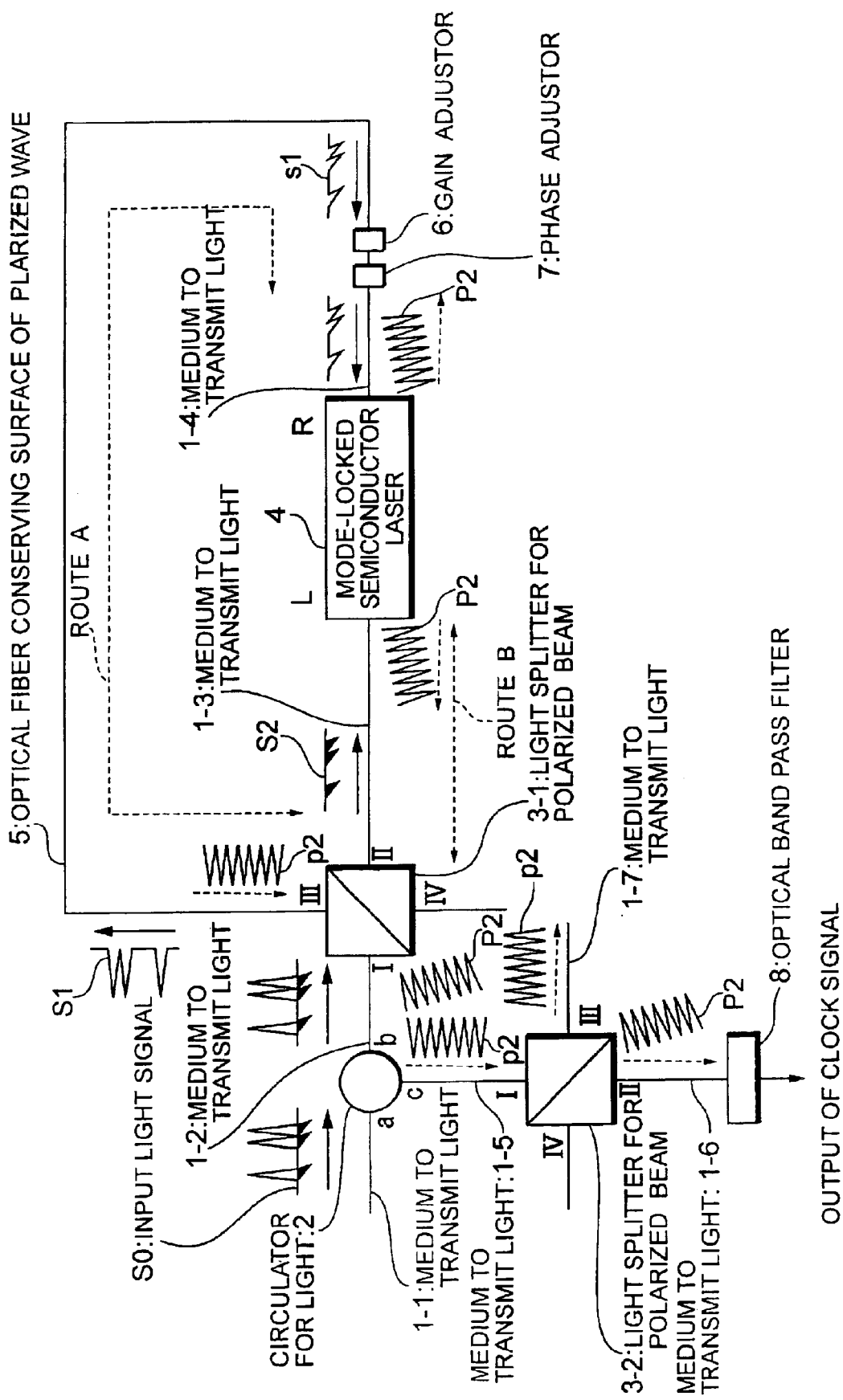
FIG. 1 is a block diagram showing structure of Embodiment 1.

Hereinafter, preferred Embodiments according to present invention will be described, referring to the drawings.

Embodiment 1

In Embodiment 1, so as not to depend on polarized wave state of inputted light signal and to obtain a stable optical clock signal; a re-generator comprises; a light splitter to split the inputted light signal into light signal in horizontal polarized wave state and light signal in vertical polarized wave state, a polarized wave rotator to be inputted with the light signal in vertical polarized wave state, to rotate the polarized wave of the light signal by a right angle and to emit a light signal in horizontal polarized wave state, and a mode-locked semiconductor laser to generate an optical clock signal synchronized with light signals received at both end faces of the mode-locked semiconductor laser; wherein the mode-locked semiconductor laser receives the light signal in horizontal polarized wave state outputted from the light splitter and the light signal in horizontal polarized wave state, outputted from the polarized wave rotator, at both end faces of semiconductor laser. Hereinafter, Embodiment 1 will be described in detail.

Configuration of Embodiment 1

FIG. 1 is a block diagram showing the structure of Embodiment 1. As shown in FIG. 1, a re-generator of optical clock signal of Embodiment 1, comprises media to transmit light 1-1 to 17, a circulator for light 2, a light splitter for polarized beam 3-1, 3-2, a mode-locked semiconductor laser 4, an optical fiber 5, again adjustor 6, a phase adjustor 7, and an optical band pass filter 8.

The media to transmit light 1-1 to 1-7 are portions to comprise a route of the light signal by connecting each device mentioned above. These are usually made up of optical fibers (preferably of single mode). However, these can be wave paths to conduct light, if sufficient attention is paid to the surface of polarized wave of light signal. Or, instead, these can be merely a space or block of quartz or glass, if they are accurately positioned.

The circulator for light 2 is a device to limit the direction of light transmitting. It has terminals not less than three. It puts out a light signal inputted from a first terminal "a" to a second terminal "b". And, it puts out a light signal inputted from a second terminal "b" to a third terminal "c". In Embodiment 1, the first terminal "a" is used as an input terminal of a light signal inputted through medium 1-1. And, the third terminal "c" is used as an output terminal of a re-generated optical clock signal. Here, a terminal means a portion where light signal is inputted or outputted. And, can also be referred to as a port. This terminal or port is connected with any of an optical connector, prism, or lens etc. which is the most suitable to kind of medium 1-1 to 1-7 to transmit light, confronting with this terminal or port.

The light splitter for polarized beam 3-1 is a separator of polarized wave to separate horizontal polarized wave and vertical polarized wave from an inputted light signal. In Embodiment 1, it separates horizontal polarized wave and vertical polarized wave from light signal inputted from a first port I. Then, the horizontal polarized wave is emitted to a second port II. And, the vertical polarized wave is emitted to a third port III. On the other hand, the horizontal polarized wave inputted from the second port II and the vertical polarized wave inputted from the third port III are emitted to the first port I. This device usually comprises a pair of combined prisms to polarize. In Embodiment 1, the first port I is connected with the second terminal b of said circulator of light 2 via the medium to transmit light 1-2. The second port II is connected with an end face L of the mode-locked semiconductor laser 4 via the medium to transmit light 1-3. And, the third port III is connected with the optical fiber 5.

Here, each port is a portion where light signal is inputted and outputted. And, it is connected with any of an optical connector, prism, or lens etc. which is the most suitable to kind of medium 1-1 to 1-7 to transmit light, confronting with this port.

Incidentally, FIG. 1 shows a side view of the device. So, a light signal of a horizontal polarized wave S2 is vertical to the sheet. And, a light signal of a vertical polarized wave S1 is parallel to the sheet.

The mode-locked semiconductor laser 4 receives a light signal of a horizontal polarized wave at an end face R from the optical fiber 5. And, it receives a light signal of a horizontal polarized wave at an end face L from the second port II of the light splitter 3-1. Then, a re-generated light clock signal synchronized with either of horizontal light signal is emitted from either or both of the end face L, R. Configuration of the mode-locked semiconductor laser is as follows.

Figure 2:
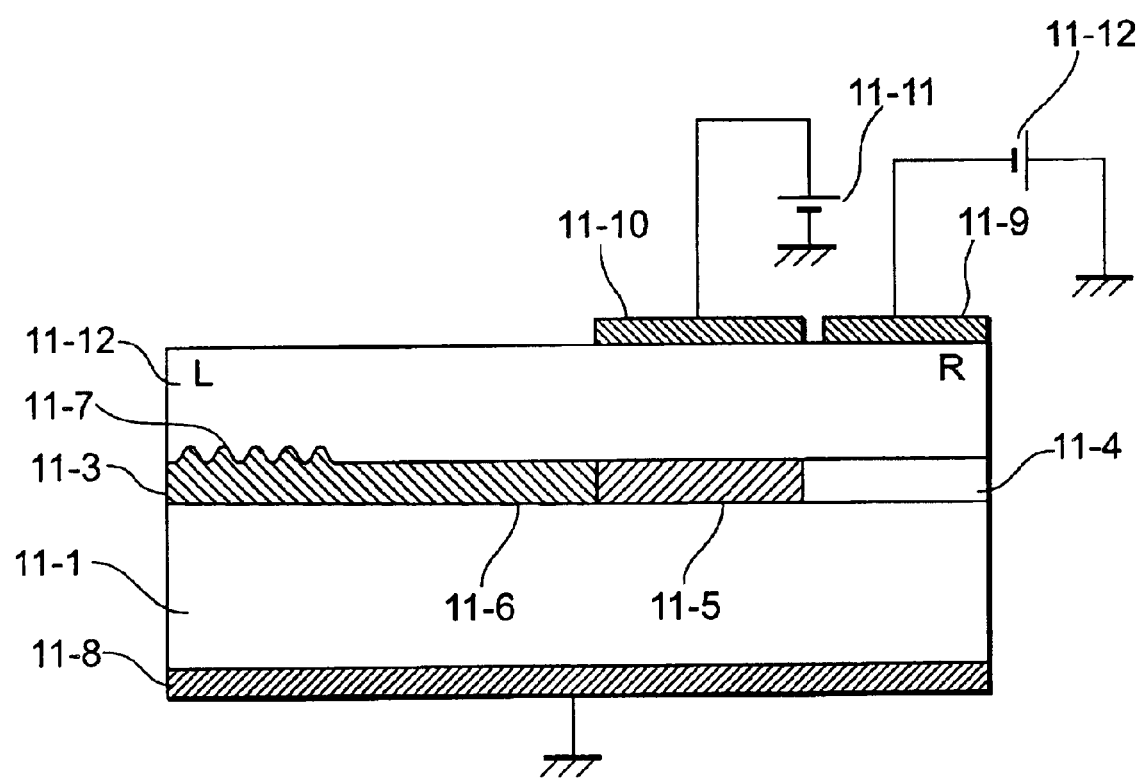
FIG. 2 is a schematic view showing mode-locked semiconductor laser.

FIG. 2 is a schematic view showing mode-locked semiconductor laser.

Hereinafter, as an example, is described a mode-locked semiconductor laser of a DBR (distributed reflection) type.

This mode-locked semiconductor laser of DBR type 10 comprises, as is already well known, an n-type clad layer 11-1, a p-type clad layer 11-2, and a wave path layer to conduct light 11-3 formed therebetween. This wave path layer 11-3 in the mode-locked semiconductor laser 10 comprises an optical modulator region 11-4, again region 11-5 to generate induced emission of light, and a wave path region 11-6 of received light. A portion of the wave pass region 11-6 is latticed, as shown in FIG. 2, to form diffractive lattice 11-7, which has a prescribed interval uniform and continuous in the portion. In the example shown in the drawing, the diffractive lattice 11-7 is formed with a series of notches of the portion of the wave path region 11-6. However, other methods, for example, a method of forming with a series of alternative refraction rate in the portion of wave path region 11-6, can be used. Or, instead, a combination of two kinds of method can be used. Moreover, notches or alternation of refraction rate can be formed in a whole of the wave path region 11-6, unlike FIG. 2.

A double-hetero structure can be adopted to the layered structure mentioned above, by forming an n-type clad layer 11-1 with n-type InP and by forming p-type clad layer 11-2 with InGaAsP.

A common electrode 11-8 is connected with the n-type clad layer 11-1. And, an electrode for optical modulator region 11-9 and an electrode for gain region 11-10 are formed on the p-type clad layer 11-2, corresponding to the optical modulator region 11-4 and the gain region 11-5 respectively.

A direct current electricity source 11-11 is connected between the electrode for gain region 11-10 and the common electrode 11-8. The gain region 11-5 is a portion to emit induced light with prescribed wave length, by the direct current electricity source 11-11 connected in regular order. The induced emission of light goes back between both reflection surfaces of wave path layer 11-3, using the wave path layer 11-3 as a resonator.

An inverse bias voltage is able to be impressed between the electrode 11-9 corresponding to the optical modulator region 11-4 and the common electrode 11-8, by an inverse direct current electricity source 11-12. The optical modulator region 114 efficiently absorbs a part of induced emission of light going around in wave path layer 11-3, while an inverse bias voltage is impressed by an inverse direct current electricity source 11-12.

Thereby, the induced emission of light is, as is already well known, synchronized about each mode. And, this synchronized induced emission of light becomes of a prescribed strength. Then, a row of light pulse corresponding to mode locked frequency fML, decided by length of the resonator, is emitted from at least one end face of the wave path layer 11-3.

Moreover, the light signal of the horizontal polarized wave emitted from the optical fiber 5 is received at one end face R. And, the light signal of the horizontal polarized wave emitted from the second port II of the light splitter 3-1 is received at the other end face L. Then, the re-generated clock signal of light synchronized with these light signals is emitted from at least one of both end faces. However, a difference of phase between a phase of the light signal received at the end face Rand a phase of the light signal received at the end face L must be half of a period of repeating pulse of the mode-locked frequency fML mentioned above, multiplied by odd number.

Back to FIG. 1 again, the optical fiber 5 rotates a face of the polarized wave. It receives light signal of vertical polarized wave from the third port III of the light splitter 3-1. And, it rotates the polarized wave of the light signal by pi/2, so as to emit light signal of horizontal wave. The optical fiber 5 is able to conserve angular position of the polarized wave surface of the light signal. This conserving ability is usually obtained by using compound diffraction obtained by giving different stress to a core portion of an optical fiber in horizontal and vertical directions respectively. Thereby, angular position of a polarized wave surface around the core of the optical fiber is conserved, in the occasion when a polarized light corresponding to the horizontal direction or vertical direction is inputted to the optical fiber 5.

According to present invention, the optical fiber 5 conserving polarized wave is laid between the third port III of light splitter 3-1 and a gain adjustor 6, in a state that the optical fiber 5 is mechanically twisted by a right angle (pi/2), that is, in a state that the direction, where polarized wave is conserved, is rotated. Thereby, the optical fiber 5 is able to receive a light signal in vertical polarized wave state, from the third port III of the light splitter 3-1, and to supply the gain adjustor 6 with a light signal in horizontal polarized wave. And, at the same time, the optical fiber 5 is able to receive a light signal in horizontal polarized wave state, from the gain adjustor 6, and to supply the third port III of the light splitter 3-1 with a light signal in vertical "polarized wave.

A gain adjustor 6 comprises an amplifier and an attenuator placed between the mode-locked semiconductor laser 4 and the optical fiber 5, to adjust difference of level of strength between light signals inputted respectively to both end faces of the light wave path layer 11-3 (FIG. 2) within 3 dB. Since a stable optical clock signal not depending on the polarized wave state of the inputted light signal, is re-generated, by adjusting difference of level of strength between light signals inputted respectively to both end faces of the light wave path layer 11-3 (FIG. 2) within 3 dB. The process of adjusting difference of level of strength between light signals within 3 dB will be described later in description of operation.

Here, each strength level of light signals inputted respectively to both end faces of the light wave path layer 11-3 (FIG. 2) is as follows. One of them is a sum of connection loss and transmission loss of light, from the third port II of the light splitter 3-1, through the optical fiber 5, the gain adjustor 6, a phase adjustor 7 and the medium 1-4, and through the end face R of the mode-locked semiconductor laser 4, to the light wave path layer 11-3 (FIG. 2). The other of them is a sum of connection loss and transmission loss of light, from the second port II of the light splitter 3-1, through the medium 1-3, and through the end face L of the mode-locked semiconductor laser 4, to the light wave path layer 11-3 (FIG. 2).

In Embodiment 1, DBR (distribution radiation) type is adopted as the mode-locked semiconductor laser 4. However, the present invention is able to adopt CMP (colliding-pulse mode-locking) as the mode-locked semiconductor laser 4, either. In this occasion, it should be considered that the difference of level of strength between light signals to b~inputted respectively to both end faces of the light wave path layer 11-3 (FIG. 2) becomes small, because the structure of the resonator of the laser becomes a symmetric structure around the central portion of the resonator.

As for the amplifier of light mentioned above, an amplifier comprising a semiconductor can be adopted. Or, instead, an amplifier comprising an optical fiber which includes a rare-earth element can be adopted. However, it should be considered that it is necessary to remove an isolator to make a one-way light path installed in the gain adjustor 6, because an amplifier comprising an optical fiber which includes a rare-earth element usually makes for a one-way light path. On the other hand, as for the attenuator, an optical thin film can be adopted. However, recently, a precise optical attenuator comprising an optical fiber where the reflection of light is small, has been developed. So, this kind of attenuator can be adopted.

The phase adjustor 7 is a line to retard the light signal, so as to adjust the difference between following phases into half of the period of the clock signal multiplied by an odd number. One of the phases is a phase of light signal wave standing on the route A, from the third port III of the light splitter 3-1, through the optical fiber 5, the gain adjustor 6, a phase adjustor 7 and the medium 1-4, and through the end face R of the mode-locked semiconductor laser 4, to the light wave path layer 11-3 (FIG. 2). The other phase is a phase of the light signal wave standing on the route B, from the second port II of the light splitter 3-1, through the medium 1-3, and through the end face L of the mode-locked semiconductor laser 4, to the light wave path layer 11-3 (FIG. 2).

As for the optical retarding line comprising the phase adjustor 7, a variable retarding line able to adjust delay time by controlling strength of an electric field impressed to optical crystal in a prescribed direction, is preferably adopted. It goes without saying that an optimum optical retarding line with a fixed delay time corresponding to the difference between the two phases can be selected so as to be adopted, if the phase difference is exactly measured.

Incidentally, in the occasion when a DBR (distribution radiation) type is adopted as the mode-locked semiconductor laser 4, it is necessary to adjust the difference between the two phases, into half of a period of the clock signal multiplied by an odd number. However, in the occasion when the CMP (colliding-pulse mode-locking) type is adopted as the mode-locked semiconductor laser 4, it is necessary to adjust the difference between the two phases into a period of the clock signal multiplied by an integral number. The difference of adjustment is caused by a difference of cycle mode about pulse row of light generated in wave path route layer conducting light in each laser. Here, further description is omitted, because it does not concern the present invention. A light splitter for polarized beam 3-2 is the same as the light splitter for polarized beam 3-1 mentioned above. That is, it is a separator of polarized wave to separate horizontal polarized wave and vertical polarized wave from a light signal inputted. In Embodiment 1, it separates a horizontal polarized wave and a vertical polarized wave from a light signal inputted from a first port I. Then, the horizontal polarized wave is emitted to a second port II. And, the vertical polarized wave is emitted to a third port III. This device usually comprises a pair of combined prisms to polarize. In Embodiment 1, the first port I is connected with the third terminal c of said circulator of light 2 via the medium to transmit light 1-5. The second port II is connected with an optical pass filter 8 via the medium to transmit light 1-6. And, the third port III is connected with another device not shown in the drawing optical fiber 5 via the medium to transmit light 1-7. The optical band pass filter 8 connected with the second port II of the light splitter for polarized beam 3-2 via the medium to transmit light 1-6, is an optical filter to transmit only a light signal having a prescribed wave length. It usually comprises a filter with multi-layered film, made up of many layers of a usual optical thin film. An output signal of this becomes an output optical clock signal re-generated.

Operation of Embodiment 1

A re-generator of an optical clock signal according to Embodiment 1 starts operating by receiving an inputted light signal S0 from an outer device not shown in the drawing. The inputted light signal S0 is put in from the first terminal a of the optical circulator 2. And, it is emitted to the second terminal b. The inputted light signal S0 emitted from the second terminal b is put in the first port I of the light splitter 3-1. And, the signal S0 is split into an element of vertical polarized wave S1 and an element of horizontal polarized wave S2, in the light splitter 3-1. Then, the element of vertical polarized wave S1 is emitted from the third port III. And, the element of horizontal polarized wave S2 is emitted from the second port II.

The element of vertical polarized wave S1 emitted from the third port III is put in the optical fiber 5. Then, the optical fiber 5 sends the element of the vertical polarized wave S1 with conserving surface of polarized wave. However, the element of vertical polarized wave S1 is emitted to be an element of horizontal polarized wave s1, being rotated by a right angle (pi/2); because the optical fiber 5 is laid in such a state that it is twisted by right angle (pi/2) between its input end and its output end. This element of horizontal polarized wave s1 goes through the gain adjustor 6 and the phase adjustor 7, to be supplied to the wave path layer 11-3 (FIG. 2) through end face R of the mode-locked semiconductor laser 4. Hereafter, this route is called route A.

On the other hand, the element of horizontal polarized wave S2 emitted from the second port II goes through the medium 1-3, to be supplied to the wave path layer 11-3 (FIG. 2) through end face L of the mode-locked semiconductor laser 4. Hereafter, this route is called route B.

Here will be described the operation when the mode-locked semiconductor laser 4 re-generates an optical clock signal by receiving a horizontal polarized wave element s1 at end face R through route A and by receiving horizontal polarized wave element S2 at end face L through route B. Now, provided that the strength of the total light quantity received at both end faces of the mode-locked semiconductor laser 4, is represented as Is; the light strength of horizontal polarized wave element s1 received at end face R through route A is represented as Is multiplied by y, and the light strength of horizontal polarized wave element S2 received at end face L through route B is represented as Is multiplied by 1 minus y. Here, y is not less than 0 and not more than 1.

Moreover, in order to secure stable operation of the clock generation, the mode-locked semiconductor laser 4 requires that scope of light strength of the inputted light signal is set to be Ip/z to Ip. Here, z is more than 1.

Because of setting the scope of light strength as mentioned above; in order to secure stable operation of the clock generation only by light strength, Is multiplied by y, of horizontal polarized wave element s1 received at end face R through route A requires a condition that, Is multiplied by y, is not less than Ip/z and not more than Ip, (Formula 1):

$$Ip/z = <Is*y = <Ip \qquad \text{(Formula 1)}$$

Similarly; in order to secure stable operation of the clock generation, only by light strength; Is multiplied by 1 minus y; of horizontal polarized wave element S2 received at end face L through route B; a condition that; Is multiplied by 1 minus y; is not less than Ip/z and not more than Ip, (Formula 2) is required.

$$Ip/z = <Is*(y-1) = <Ip \qquad \text{(Formula 2)}$$

By Formula 1 and Formula 2; in order to secure stable operation of the clock generation, by sum of light strength, Is, of total elements s1 and S1 received at end face R and L through route A and B; obtained by easy transformation of formulas, is a condition that, Is is not more than Ip and Ip/Is is not more than z/2, (Formula 3):

$$Is = <Ip \text{ and, } Ip/Is = <z/2 \qquad \text{(Formula 3)}$$

By Formula 3, in the occasion when Is is set to be equal to Ip, z comes to be not less than 2.

That is, Ip/z becomes to be not more than Ip/2. In this occasion, if the mode-locked semiconductor laser 4 is able to secure stable operation of the clock generation, by an input light strength less than half of Ip (if it has a margin of power more than 3 dB), it becomes possible to operate within a scope that y is not less than O and not more than 1.

Figure 3:
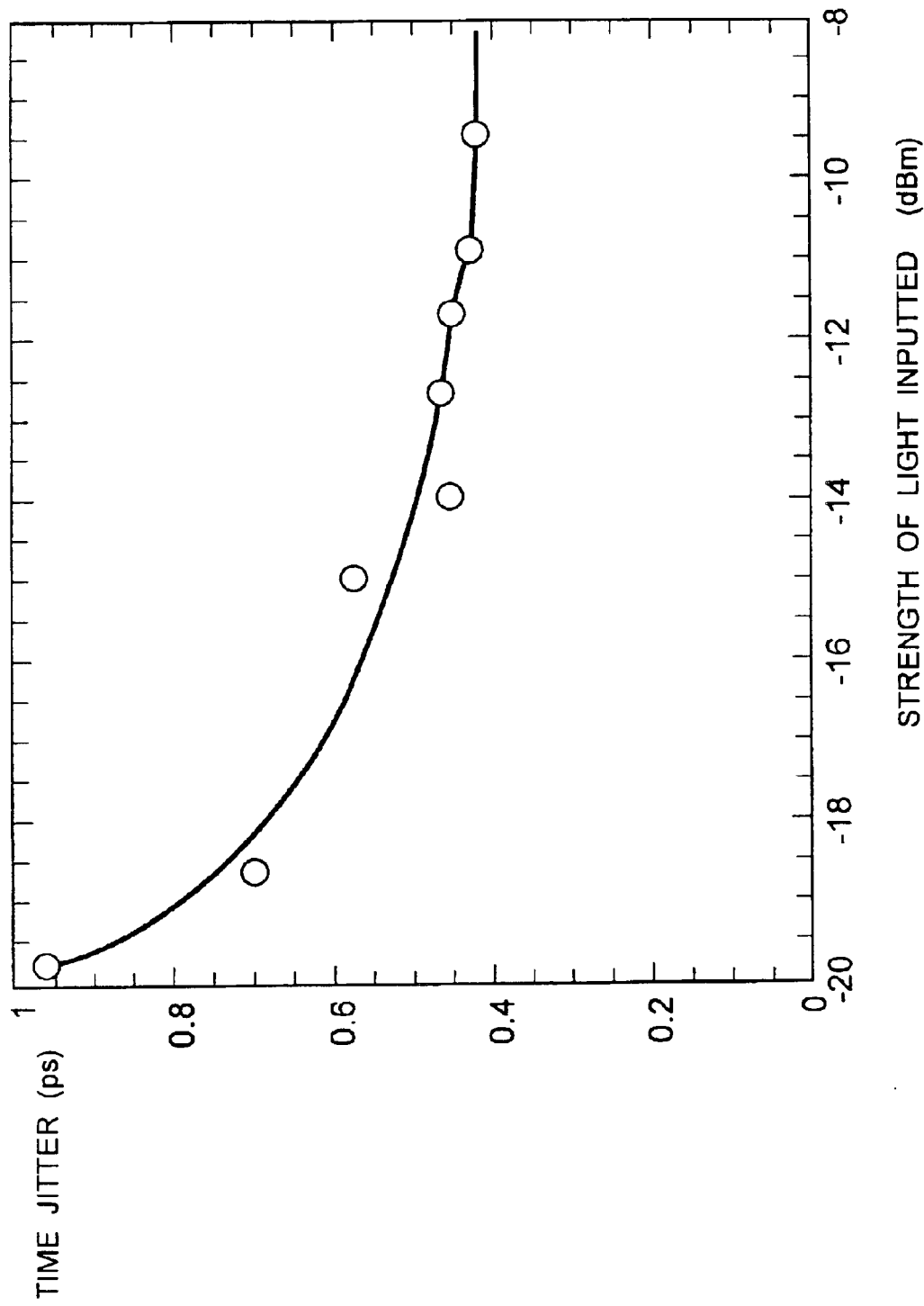
FIG. 3 is a graph showing jitter characteristic of light clock signal (case 1).

FIG. 3 is a graph showing jitter characteristic of the optical clock signal (case 1).

A horizontal axis represents strength of light inputted (dBm). And, a vertical axis represents time jitter (ps: picosecond). The graph of FIG. 3 represents a jitter characteristic of each clock signal corresponding to each strength of light inputted when light signal of horizontal polarized wave with 160 GHz pulse repeating frequency is inputted through one end face R of mode-locked semiconductor laser 4 of 160 GHz of pulse repeating frequency.

As shown in FIG. 3, in the occasion when the light inputted is between −8 dBm and −14 dBm, the time jitter is an extent of 0.42 ps, almost changeless. This range corresponds to the range from Ip/z to Ip of the strength of total light inputted at both end faces to secure stable operation of the generation of clock. That is, a condition that the margin of power requires more than 3 dB, is satisfied.

In the process of introducing Formula 1 to 3, some factors were not described. That is, loss of light strength in optical connection or transmission in route A and B; attenuation by diffracting lattice 11-7 (FIG. 2) equipped at end face L of mode-locked semiconductor laser of DBR type. However, these factors are not negligible to obtain a satisfactory regenerator.

Therefore, the gain adjustor 6 is used so as to adjust the light strength corresponding to factors such as, loss of light strength in optical connection or transmission in route A and B, attenuation by diffracting lattice 11-7 (FIG. 2) equipped at end face L of the mode-locked semiconductor laser of the DBR type. Especially, attenuation by diffracting lattice 11-7 (FIG. 2) is somewhat of a large factor. And, in general, light strength of a horizontal polarized wave element 82 inputted in the mode-locked semiconductor laser 4 through end face L from route B is larger than light strength of another horizontal polarized wave element s1 inputted in the mode-locked semiconductor laser 4 through end face R from route A. However, in the occasion when a mode-locked semiconductor laser 4 of CPM type is used, it is not necessary to consider attenuation by diffracting lattice 11-7 (FIG. 2).

Figure 4:
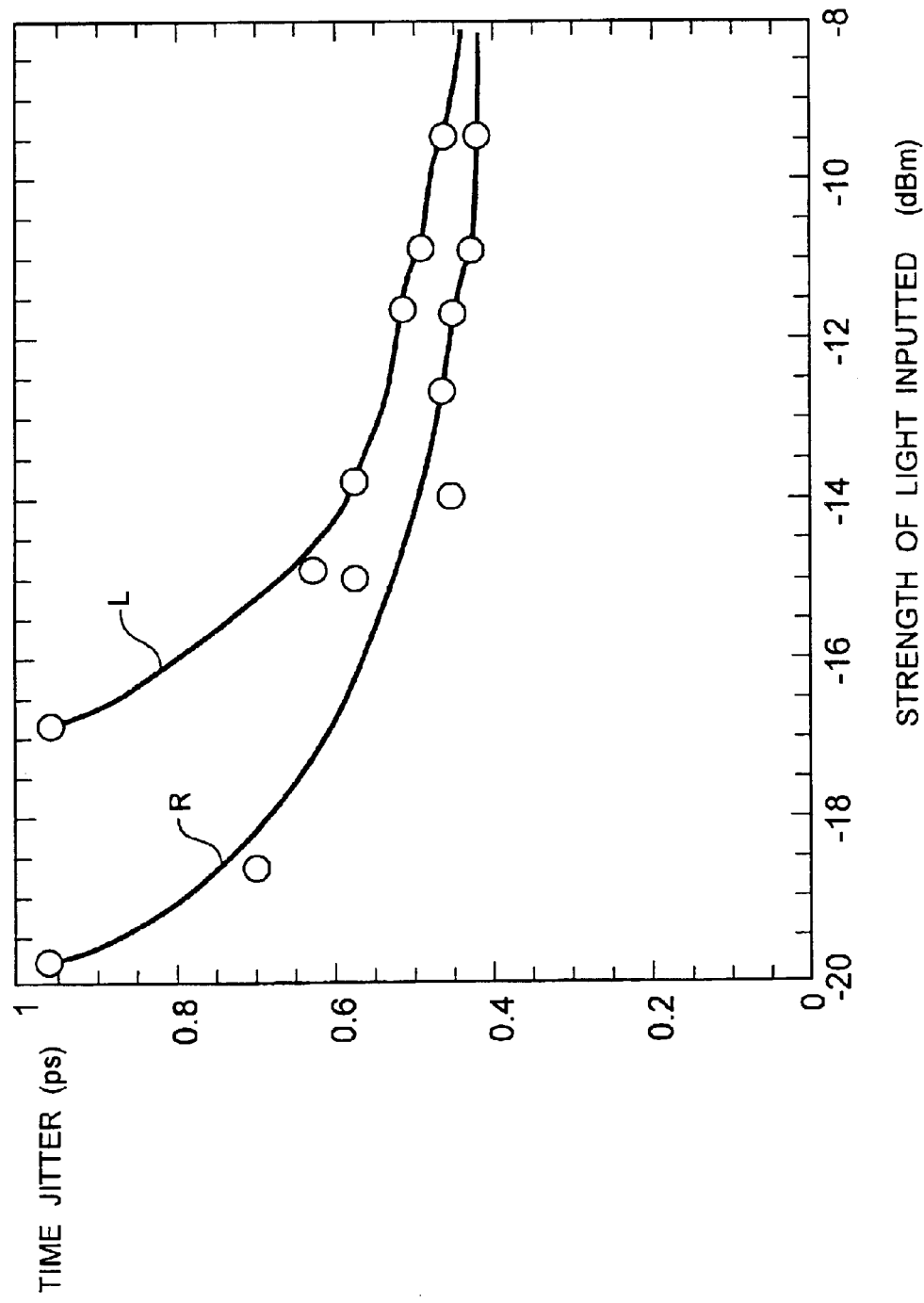
FIG. 4 is a graph showing jitter characteristic of light clock signal (case 2).

FIG. 4 is a graph showing jitter characteristic of the optical clock signal (case 2).

A horizontal axis represents the strength of light inputted (dBm). And, a vertical axis represents time jitter (ps). The graph of FIG. 4 represents a jitter characteristic of each clock signal corresponding to each strength of light inputted when the light signal of horizontal polarized wave with 160 GHz of pulse repeating frequency is inputted through one end face R or the other end face L of mode-locked semiconductor laser 4 of 160 GHz of pulse repeating frequency. Here, the graph representing a characteristic in the occasion when the light signal of horizontal polarized wave is inputted through end face L of mode-locked semiconductor laser 4, is designated as L in FIG. 4. And, the graph representing a characteristic in the occasion when light signal of horizontal polarized wave is inputted through end face R of mode-locked semiconductor laser 4, is designated as R in FIG. 4.

As shown in FIG. 4, there is difference of an extent of about 3 dB in light strength inputted, between graph L and R. However, the time jitter is not large when the light strength is not more than about −14 dBm. This experimental result proves that a re-generator of an optical clock signal not depending on a surface of polarized wave of inputted signal S0, if loss of light transmission in route A and loss of light transmission in route B are equalized.

Incidentally, these graphs in FIG. 4 represent characteristics in the occasion when a mode-locked semiconductor laser 4 of the DBR type is used. However, in the occasion when a mode-locked semiconductor laser 4 of the CPM type is used, attenuation by the diffracting lattice is not caused. So, there is little difference of inputted light strength between graph L and R. And, a gain adjustor 6 becomes needless.

In the description above; difference of phases between the horizontal polarized wave element s1 inputted in the mode-locked semiconductor laser 4 through end face R from route A, and the horizontal polarized wave element S2 inputted in the mode-locked semiconductor laser 4 through end face L from route B is not described. However, actually, the phase difference becomes large with the difference of delay time between route A and B. Moreover, in mode-locked semiconductor laser of the DBR type, the phase difference of light inputted at both end faces, must be a half of the pulse repeating period multiplied by an odd number.

However, in the occasion when a mode-locked semiconductor laser of the CPM type is used, the phase difference of light inputted at both end faces, must be a full pulse of repeating period multiplied by an integral number. Either of these phase differences are adjusted by the phase adjustor 7.

As mentioned above, a part of the optical clock signal re-generated by the mode-locked semiconductor laser 4 becomes a horizontal polarized wave element P2, so as to be sent from end face L to the second port II of light splitter 3-1 through medium 1-3. Similarly, the rest of the optical clock signal re-generated, becomes a horizontal polarized wave element P2, so as to be sent from end face R to the optical fiber 5 through medium 1-4, phase adjustor 7, and gain adjustor 6. This horizontal polarized wave element P2 is rotated by the optical fiber 5 to become a vertical polarized wave element p2, so as to be sent to the third port III of light splitter 3-1.

The horizontal polarized wave element P2 inputted to the second port II of light splitter 31 and the vertical polarized wave element p2 inputted to the third port H1 of light splitter 3-1, overlap with each other. And, the overlapped wave is emitted from the first port I of light splitter 3-1, so as to be inputted to the second terminal b of optical circulator 2, through medium 1-2. Further, the overlapped wave is emitted from the third port III of optical circulator 2, so as to be inputted to the first port I of light splitter 3-2, through medium 1-5.

The overlapped wave inputted to the first port I of light splitter 3-2 is separated, in the light splitter 3-2, into a vertical polarized wave element p2 and a horizontal polarized wave element P2. The vertical polarized wave element p2 is emitted from the third port III to an outer device not shown in the drawing, through medium 1-7. The horizontal polarized wave element P2 is emitted from the second port II to the optical band pass filter 8, through medium 1-6. The horizontal polarized wave element P2, comprising an optical clock signal, gets rid of optical noise in the optical band pass filter 8, so as to be a re-generated clock signal to be emitted.

Effects of Embodiment 1

As described above, according to Embodiment 1, obtained is an effect that, a re-generator able to re-generate a stable optical clock signal without depending on polarized wave state of inputted light signal is provided.

Moreover, in the occasion when a mode-locked semiconductor laser with CMP type is used, the difference of inputted light strength existing between graph L and R shown in FIG. 4 becomes almost negligible. Therefore, another effect is obtained, that again adjustor becomes needless.

Configuration of Embodiment 2

Figure 5:
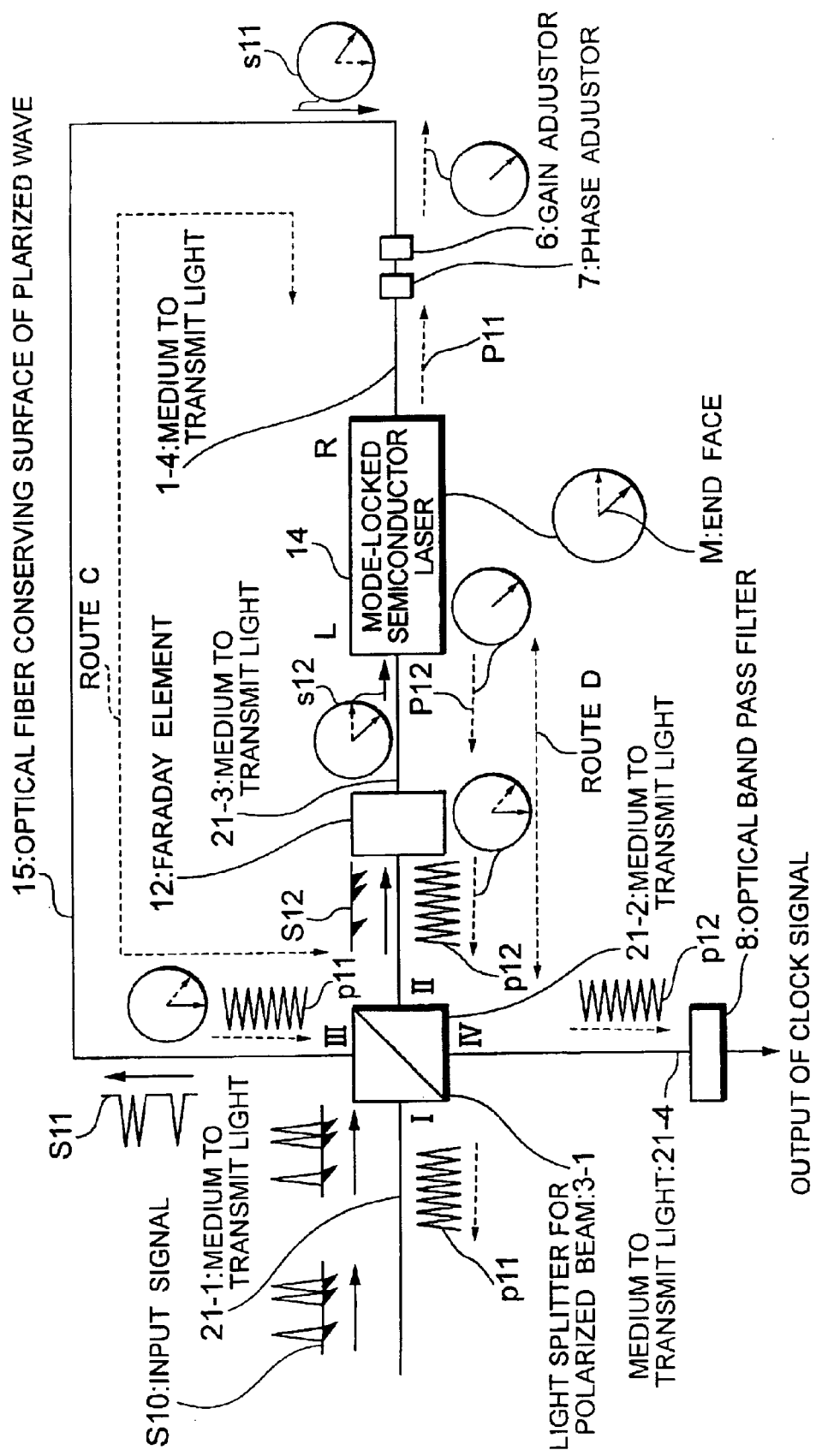
FIG. 5 is a block diagram showing structure of Embodiment 2.

In Embodiment 2, in order to cut down the cost of the re-generator as a whole, the re-generator is made up as follows, so as to exclude expensive parts such as optical circulator etc. out of the configuration of Embodiment 1. FIG. 5 is a block diagram showing the structure of Embodiment 2. As shown in FIG. 5, a re-generator of the optical clock signal of Embodiment 2 comprises media to transmit light 1-4, 21-1 to 214, a light splitter for polarized beam 3-1, a mode-locked semiconductor laser 14, an optical fiber 15, a gain adjustor 6, a phase adjustor 7, an optical band pass filter 8, and a Faraday element 12.

In the description of Embodiment 2, only points different from Embodiment 1 will be described. Elements the same as Embodiment 1 in Embodiment 2 are designated with symbols the same as Embodiment 1. Revolving vectors indicating directions of polarized wave surface and a direction of angular position of the mode-locked semiconductor laser 14 all represent angular positions looking in a direction from left to right in FIG. 5.

The media to transmit light 21-1 to 21-4 have both configuration and function the same as those of Embodiment 1. They differ only in what they are connected. So, descriptions of those are omitted.

The mode-locked semiconductor laser 14 accepts, at one end face, light signal s11 outputted from the optical fiber 15. And, it accepts, at the other end face, light signal s12 outputted from the Faraday element 12. In this occasion, the polarized wave surface of the light signal s11 outputted from the optical fiber 15 is rotated by pi/4 counter-clockwise, as shown in the circle designated by s11 in FIG. 5, by a bold arrow. And, the polarized wave surface of the light signal s12 outputted from the Faraday element 12 is rotated by pi/4 clockwise, as shown in the circle designated as s12 in FIG. 5, by a bold arrow. On the other hand, the mode-locked semiconductor laser 4 is placed declined by pi/4 clockwise, as shown in the circle on the end face of the laser designated as M in FIG. 5, by a bold arrow. Thereby, the laser is able to accept both light signals s11 and s12 as horizontal polarized waves to the wave path layer to conduct light 11-3 (FIG. 2). However, both of configuration and function of the laser 14 are same as laser 4 in Embodiment 1 (FIG. 1).

The optical fiber 15 is a first rotator to rotate the surface of polarized wave. The optical fiber 15 is able to conserve angular position of the polarized wave surface of the light signal, as well as the optical fiber 5. The optical fiber 15, conserving polarized wave, is laid between the third port II of light splitter 3-1 and a gain adjustor 6, in such a state that the optical fiber 15 is mechanically twisted by a half right angle (pi/4) counter-clockwise. Thereby, the optical fiber 15 is able to receive a light signal in vertical polarized wave state, from the third port III of the light splitter 3-1, and to supply the gain adjustor 6 with a light signal in polarized wave rotated by a half right angle (pi/4) counter-clockwise. And, at the same time, the optical fiber 15 is able to receive a light signal P11 in polarized wave rotated by a half right angle (pi/4) counter-clockwise, from the gain adjustor 6, and to supply the third port III of the light splitter 3-1 with a light signal p11 in vertical polarized wave.

The Faraday element 12 is a second rotator to rotate the surface of the polarized wave. The Faraday element 12 is a magneto-optical element to receive a light signal 812 in horizontal polarized wave state, from the second port II of the light splitter 3-1, and to supply the mode-locked semiconductor laser 14 with a light signal s12 in polarized wave rotated by a half right angle (pi/4) clockwise. And, at the same time, the Faraday element 12 receives a light signal P12 in polarized wave rotated by a half right angle (pi/4) clockwise, from the mode-locked semiconductor laser 14, and to supply the second port I of the light splitter 3-1 with a light signal p12 in vertical polarized wave. In this way, the polarized wave surface rotates clockwise whether the direction of light transmission is right to left or left to right; because the Faraday element 12 of a magneto-optical element rotates a beam of light, depending on a direction of magnetic field to be impressed, to a uniform rotary direction around the direction the light beam transmits whichever the direction of the light beam is.

Operation of Embodiment 2

A re-generator of an optical clock signal according to Embodiment 2, starts operating by receiving an inputted light signal S10 from an outer device not shown in the drawing. The inputted light signal S10 is put in from the first port I of the light splitter 3-1. And, the signal S10 is split into an element of vertical polarized wave S11 and an element of horizontal polarized wave S12, in the light splitter 3-1. Then, the element of vertical polarized wave S111 is emitted from the third port III. And, the element of horizontal polarized wave S12 is emitted from the second port II.

The element of vertical polarized wave S11, emitted from the third port III, is put in the optical fiber 15. Then, the optical fiber 15 sends the element of vertical polarized wave S11 with a conserving surface of polarized wave. However, the element of vertical polarized wave S11 is emitted as an light signal s11, being rotated by half right angle (pi/4); because the optical fiber 15 is laid in such a state that it is mechanically twisted by a half right angle (pi/4) between its input end and its output end. This light signal s11 goes through the gain adjustor 6 and the phase adjustor 7, to be supplied to the wave path layer 11-3 (FIG. 2) through end face R of the mode-locked semiconductor laser 14. Hereafter, this route is called route C.

On the other hand, the element of horizontal polarized wave S12 emitted from the second port II, goes through the medium 21-2, to be sent to the Faraday element 12. The element of horizontal polarized wave S12 is rotated by pi/4 clockwise, to be supplied to the wave path layer 11-3 (FIG. 2) through end face L of the mode-locked semiconductor laser 14 which is declined by pi/4 clockwise. Hereafter, this route is called route D.

Here, omitted is a description of the operation in the occasion when the mode-locked semiconductor laser 14 re-generates an optical clock signal by receiving the light signal s11 at end face R through route C and by receiving the light signal s12 at end face L through route D, because the description is same as Embodiment 1. So, now will be described an operation after an optical clock signal is re-generated by the mode-locked semiconductor laser 14.

A part of the optical clock signal re-generated by the mode-locked semiconductor laser 14 becomes an optical clock signal P12, so as to be sent to the Faraday element 12. The polarized wave surface of the optical clock signal P12 is rotated in the Faraday element 12 by pi/4 clockwise, so as to become an optical clock signal p12 in a vertical polarized wave state. And, this optical clock signal p12 is sent to the second port II of light splitter 3-1 through medium 212. Similarly, the rest the of the optical clock signal that is re-generated becomes an optical clock signal P11, so as to be sent from end face R to the optical fiber 15 through medium 1-4, phase adjustor 7, and gain adjustor 6. This optical clock signal P11 is rotated in the optical fiber 15 by pi/4 clockwise (not counter-clockwise, because the transmitting direction of light beam is reverse), to become a vertical polarized wave element p11, so as to be sent to the third port III of light splitter 3-1.

The optical clock signal p12 in vertical polarized wave state, inputted to the second port II of light splitter 3-1, is emitted from a fourth port IV, so as to be sent to the optical band pass filter 8, through medium 21-4. The optical clock signal p12, in vertical polarized wave state, gets rid of optical noise in the optical band pass filter 8, so as to be a re-generated clock signal to be emitted.

Moreover, the optical clock signal p11 in vertical polarized wave state inputted to the third port III of light splitter 3-1, is emitted from the first port I.

Effects of Embodiment 2

As described above, according to Embodiment 2, an effect is obtained, together with the effect of Embodiment 1, that, a re-generator able to cut down the cost of the re-generator as a whole, is provided, because expensive parts such as the optical circulator etc. are excluded out of the configuration of Embodiment 1.

Other Embodiments

Although Embodiment 1 and 2 used a mode-locked semiconductor laser of DBR type or CMP type, the present invention is not limited to these embodiments. And, it is realizable with any type of mode-locked semiconductor laser performing operation for re-generating an optical clock signal from an inputted light signal.

What is claimed is:

1. A re-generator of an optical clock signal comprising a mode-locked semiconductor laser which puts out a regenerated optical clock signal from one end face of the mode-locked semiconductor laser when light signals each of which have the same polarized wave state are inputted at both end faces of the mode-locked semiconductor laser, wherein the re-generator further comprises:

a light splitter to split a light signal into two polarized signals with respective polarizations different by a right angle, and to put out one of the polarized signals split from the light signal to one of the end faces of the mode-locked semiconductor laser; and a rotator to rotate the other of the polarized signals by a right angle, and to lead the rotated other of the polarized signals to the other of the end faces of the mode-locked semiconductor laser.

2. The re-generator of an optical clock signal according to claim 1, wherein the rotator comprises an optical fiber which is able to conserve angular position of the polarized wave surface, being laid mechanically twisted by a right angle.

3. The re-generator of an optical clock signal according to claim 1, further comprising a gain adjustor provided in one of the routes to the end faces of said mode-locked semiconductor laser, so as to adjust the strength of a light signal transmitting over the one of said routes.

4. The re-generator of an optical clock signal according to claim 3, wherein said gain adjustor comprises an optical amplifier.

5. The re-generator of an optical clock signal according to claim 3, wherein said gain adjustor comprises an optical attenuator.

6. The re-generator of an optical clock signal according to claim 1, further comprising a phase adjustor provided in one of the routes to the end faces of said mode-locked semiconductor laser, so as to adjust the phase of a lights signal transmitting over the one of said routes.

7. A re-generator of an optical clock signal, comprising:

a limiter for limiting direction of transmission of light, wherein a light signal put in to a first terminal is put out through a second terminal, and a light signal put in to the second terminal is put out through a third terminal;

a light splitter to split the light signal put out from the second terminal and inputted through a first port of the splitter, into two polarized signals with respective polarizations different by a right angle, to put out one of the polarized signals split from the light signal to a second port, to put out the other of the polarized signals split from the light signal to a third port, and to put out to the first port the light signal inputted from the second port and the other light signal inputted from the third port;

a rotator to receive, and rotate by a right angle the other of the polarized signals from the third port, so as to put out a light signal having a polarization the same as the one of the polarized signals; and a mode-locked semiconductor laser to be inputted at one end face thereof with the polarized signal outputted from the rotator, to be inputted at the other end face with the one of the polarized signals split by the light splitter, and to put out a re-generated optical clock signal from at least one of the end faces of the mode-locked semiconductor laser.

8. A re-generator of an optical clock signal, comprising:

a light splitter to split a light signal inputted through a first port into two polarized signals having polarizations different by a right angle, to put out one of the polarized signals split from the light signal to a second port, to put out another of the polarized signals split from the light signal to a third port, and to put out a light signal entering the second port to a forth port, and another light signal entering the third port to the first port;

a first rotator to receive and rotate by a half right angle the other of the polarized signals from the third port, so as to put out a light signal element having a polarization rotated by a half right angle;

a second rotator to receive the one of the polarized signals from the second port and to rotate the one of the polarized signals by a half right angle without depending on a direction in which a light signal transmits, so as to put out a light signal having a polarization rotated by a half right angle in a rotary direction opposite to said first rotator when a light signal passes in one direction and rotated by a half right angle in the same rotary direction as said first rotator when the light signal passes in an opposite direction; and a mode-locked semiconductor laser declined by a half right angle in a rotary direction opposite to said first rotator, which is the same direction as said second rotator, to be inputted at one end face thereof with the polarized wave rotated by a half right angle outputted from the first rotator, to be inputted at the other end face with the light signal outputted form the second rotator having a polarization rotated by a half right angle in a rotary direction opposite to said first rotator, and to put out a regenerated optical clock signal from at least one of the end faces of the mode-locked semiconductor laser.

9. The re-generator of an optical clock signal according to claim 8, wherein said first rotator comprises an optical fiber able to conserve angular position of the polarized wave surface, being laid mechanically twisted by a half right angle.

10. The re-generator of an optical clock signal according to claim 8, wherein said second rotator comprises a Faraday element of a magneto-optical element.

* * * * *